United States Patent [19]

Siegel

[11] 4,252,331

[45] Feb. 24, 1981

[54] SEALING ARRANGEMENT

[75] Inventor: Heinz Siegel, Stuttgart, Fed. Rep. of Germany

[73] Assignee: Robert Bosch GmbH, Stuttgart, Fed. Rep. of Germany

[21] Appl. No.: 46,375

[22] Filed: Jun. 7, 1979

[30] Foreign Application Priority Data

Jul. 1, 1978 [DE] Fed. Rep. of Germany ....... 2829029

[51] Int. Cl.$^3$ .................... F16J 15/24; F16J 15/32
[52] U.S. Cl. .................... 277/144; 277/165; 277/188 R; 277/190; 277/198
[58] Field of Search ................... 277/119–121, 277/142–145, 152, 154, 165, 170–172, 188 R, 188 A, 190, 198

[56] References Cited

U.S. PATENT DOCUMENTS

| | | | |
|---|---|---|---|
| 2,631,907 | 3/1953 | Johnson | 277/143 |
| 3,269,737 | 8/1966 | Freese | 277/190 X |
| 3,550,988 | 12/1970 | Schenck | 277/144 X |
| 3,586,289 | 6/1971 | Priese | 277/144 X |
| 3,601,419 | 8/1971 | Fern | 277/205 |
| 3,614,114 | 10/1971 | Traub | 277/143 X |
| 3,630,532 | 12/1971 | Traub | 277/144 |
| 3,663,024 | 5/1972 | Traub | 277/165 |
| 3,663,076 | 5/1972 | Valente | 277/190 X |
| 3,716,245 | 2/1973 | Turolla | 277/188 R X |
| 3,765,690 | 10/1973 | Sievenpiper | 277/121 |
| 3,774,920 | 11/1973 | Sievenpiper | 277/165 |
| 4,032,159 | 6/1977 | Zitting | 277/190 X |

FOREIGN PATENT DOCUMENTS

| | | | |
|---|---|---|---|
| 1951970 | 6/1970 | Fed. Rep. of Germany | 277/144 |
| 1190937 | 5/1970 | United Kingdom | 277/190 |
| 1316841 | 5/1973 | United Kingdom | 277/188 A |
| 1316842 | 5/1973 | United Kingdom | 277/188 A |

Primary Examiner—Robert S. Ward, Jr.
Attorney, Agent, or Firm—Michael J. Striker

[57] ABSTRACT

A sealing arrangement for a two member couple, includes a sealing ring which is interposed between the two members of the couple and having a face which engages one of the members and two axially spaced edges. An elastically resilient ring is interposed between the other member of the couple and the sealing ring and exerting upon the same a biasing force which acts upon the sealing ring adjacent to one of the edges so as to press the face of the sealing ring into tight sealing engagement with the above-mentioned one member of the couple.

9 Claims, 8 Drawing Figures

SEALING ARRANGEMENT

BACKGROUND OF THE INVENTION

The present invention relates to a sealing arrangement.

More particularly, the present invention is concerned with a sealing arrangement for a two-member couple, such as a cylinder-piston unit.

It is known in the art to provide a sealing arrangement having a sealing ring interposed between two members of a couple. The sealing ring has a face which engages one of the members (e.g. the piston) of the couple. Such a sealing ring has a rectangular cross-section and extends over an entire width of a groove provided on the other member (e.g. the cylinder) of the couple. The sealing arrangement further includes an O-ring which is interposed between the other member of the couple and the sealing ring so as to press the face of the sealing ring against the above-mentioned one member (i.e. the piston).

The face of the sealing ring has two axially spaced edges. The pressing force of the O-ring is concentrated on the area of an intermediate portion of the face of the sealing ring, that is the portion located between the axially spaced edges of the face. However, the edges are only slightly (if at all) under the influence of the pressing force. In other words, the further from the intermediate portion towards the edges of the face, the smaller the influence of the pressing force exerted by the O-ring on the sealing ring.

Thus, during the operation of such a sealing arrangement the edge portions may deflect in a direction away from the above-mentioned one member of the couple. Obviously, even a small deflection of edges of the sealing ring away from the above-mentioned one member will lead to a leak between the members of the couple.

SUMMARY OF THE INVENTION

It is an object of the present invention to avoid the disadvantages of the prior-art sealing arrangements.

More particularly, it is an object of the present invention to provide such a sealing arrangement which prevents (or substantially reduces) leak between members of a couple.

In pursuance of these objects, and others which will become apparent hereafter, one feature of the present invention resides in providing a sealing arrangement for a two-member couple, comprising a sealing ring interposed between the two members of the couple and having a face which engages one of said members and two axially spaced edges. An elastically resilient ring is interposed between the other member of said couple and said sealing ring and exerting upon the same a biasing force which acts upon said sealing ring adjacent to one of said edges so as to press said force of the sealing ring into tight sealing engagement with said one member.

Thus, since the biasing force acts adjacent to one of the edges of the sealing ring, it increases the effectiveness of the tight sealing engagement of the sealing ring and said one member of the couple.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
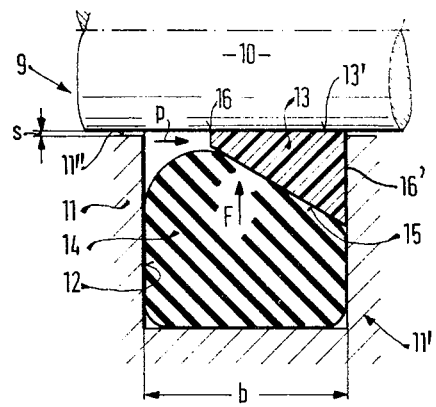
FIG. 1 is a partial section of a couple provided with a sealing arrangement according to the present invention.

Referring now to the drawings, it may be seen that the reference numeral 9 designates a cylinder-piston unit which includes a cylinder 11 and a piston 10 which is slidable along an inner surface 11" of the cylinder 11.

A sealing arrangement between the piston 10 and the cylinder 11 is designated in toto by the reference numeral 11'. The sealing arrangement is installed in a circumferential groove 12 which is provided in the cylinder 11. However, it is to be understood that the sealing arrangement 11' may be installed in the circumferential groove 12 which is provided in the piston 10, rather than in the cylinder 11.

The groove 12 may have a rectangular (e.g. quadrangular) or any other cross-section. The groove 12 has a width designated by b.

The sealing arrangement 11' includes a sealing ring 13 which has a face 13' which engages the outer surface of the piston 10. The sealing arrangement 11' further includes an elastically resilient ring 14 (e.g. O-ring) which is interposed between the sealing ring 13 and the inner surfaces of the groove 12. The sealing ring 13 compresses the resilient ring 14 in the groove 12. Due to the inherent tendency of the resilient ring 14 to return to its unstressed portion, i.e. to expand, the latter urges the sealing ring 13 in general and the face 13' thereof in particular against the outer surface of the piston 10. The corresponding biasing force of the resilient ring 14 acts in the direction indicated by the arrow F.

A gap s is arranged between the outer surface of the piston 10 and an inner surface 11" of the cylinder 11. When the cylinder piston unit is in operation a pressure medium (e.g. air, liquid, etc.) acts (see the arrow P) through the gap s onto the sealing ring 13 which projects through the gap s towards and into engagement with the outer surface of the piston 10.

In the known sealing arrangements, the sealing ring 13 extends over the entire width b of the groove 12 and the force F acts in the middle of the sealing ring 13. Obviously, the biasing force F of the resilient ring 14, though sufficient in a central area of the sealing ring 13, reduces its pressing effect on the sealing ring 13 the further the distance the edges of the face 13' is from the central area of the sealing ring 13. Moreover, right at the edges of the face 13' of the sealing ring 13, the biasing force F has no influence on the sealing engagement of the face 13' with the outer surface of the piston 10. Therefore, due to the stresses P of the pressure medium, the edges of the face 13' of the sealing ring 13 may deflect in direction away from the outer surface of the piston 10. Obviously, even a small deflection of this nature may cause leak through the gap s and between the outer surface of the piston 10 and the inner surface of the cylinder 11.

In order to prevent such a leak, the sealing ring 13 extends only through a part of the width b of the groove 12. It is advantageous if the sealing ring 13 extends along a half of the width b of the groove 12. However, according to a preferred embodiment, the sealing ring 13 extends approximately over two-thirds of the width b of the groove 12. The sealing ring 13 is formed with an inclined surface 15, so that the thickness of the material of the sealing ring 13 increases from one edge 16 towards the other edge 16'. Thus, the sealing ring 13 forms a triangular cross-section with one corner cut off so as to form the annular edge 16.

The edge 16 is located substantially along or adjacent to the biasing force F. In other words, the resilient ring 14 exerts upon the sealing ring 13 the biasing force F which acts upon the sealing ring 13 adjacent to the edge 16.

Such an arrangement of the sealing ring 13 relative to the resilient ring 14 in general and the biasing force thereof in particular insures that the edge 16 does not deflect away from the outer surface of the piston 10 during the operation of the cylinder-piston unit 9. Obviously, any leak of the pressure medium between the outer surface of the piston 10 and the inner surface of the cylinder 11 is precluded.

The sealing ring 13 may be made of synthetic plastic material such as polytetrafluoroethylene or polytetrafluoroethylene-compound material. The resilient ring 14 may be made of synthetic plastic material such as elastomeric rubber.

FIGS. 2, 3, 4, 5 and 7 illustrate different embodiments of the sealing arrangement 11'. Elements of the sealing arrangement 11' shown in FIGS. 2, 3, 4, 5 and 7 which essentially correspond to the elements of the sealing arrangement 11' described in connection with FIG. 1 are designated in FIGS. 2, 3, 4, 5 and 7 with the same reference numerals.

Figure 2:
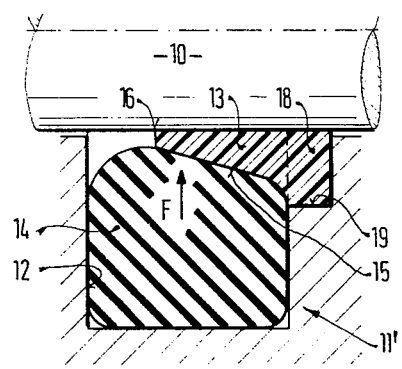
FIG. 2 is a partial section of the couple provided with another embodiment of the sealing arrangement.
Figure 3:
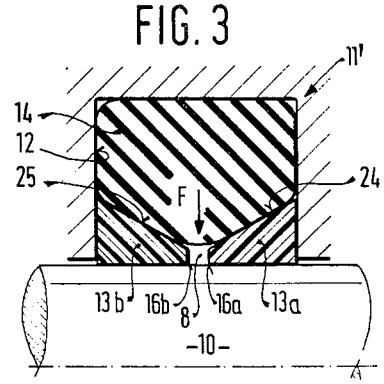
FIG. 3 is a partial section of the couple provided with still another embodiment of the sealing arrangement.
Figure 6:
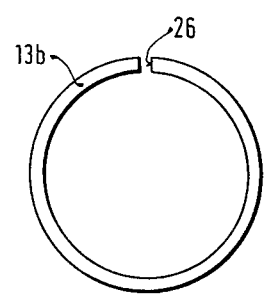
FIG. 6 is a front view of a ring shown in FIGS. 3 and 4.

The sealing arrangement 11' shown in FIG. 2 differentiates from that shown in FIG. 1 in that the groove 12 has a compound configuration, that is the groove 12 is provided with a recess 19 forming a circumferential shoulder for supporting a portion 18 of the sealing ring 13. The inclination of the surface 15 of the sealing ring 13 shown in FIG. 2 is substantially smaller than that of the surface 15 of the sealing ring 13 shown in FIG. 1. The inclination of the surface 15 in the embodiment shown in FIG. 2 constitutes about 30°. FIG. 3 shows still another embodiment of the sealing arrangement 11' which includes one resilient ring 14, a sealing ring 13a (substantially similar to the sealing ring 13 shown in FIG. 1) and a supporting ring 13b (e.g. another sealing ring similar to the sealing ring 13a). Both rings 13a and 13b extend over only respective portions of the width of the groove 12. In other words, each of the rings 13a and 13b extends less by a half of the width of the groove 12 so as to leave a gap 8 between the respective edges 16a and 16b of the rings 13a and 13b. The rings 13a and 13b have inclined surfaces 24 and 25, respectively. The inclined surfaces 24 and 25 may have the same or different inclination. In the embodiment shown in FIG. 3, the surfaces 24 and 25 have the same inclination. The rings 13a and 13b have faces which tightly sealingly engage the outer surface of the piston 10. The supporting ring 13b may not be circumferentially complete. In other words, the supporting ring 13b may have a slit 26 (see FIG. 6) so as to facilitate the process of installing the supporting ring 13b in the groove 12 between the piston 10 and the cylinder 11. The pressure medium may come into the gap 8 between the rings 13b and 13a through the slit 26 of the supporting ring 13b.

Figure 4:
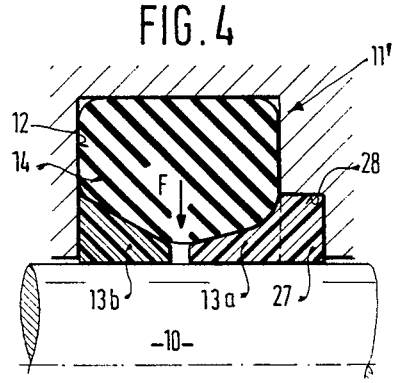
FIG. 4 is a partial section of the couple provided with yet another embodiment of the sealing arrangement.

FIG. 4 shows yet another embodiment of the sealing arrangement 11' similar to that shown in FIG. 3. However, in the embodiment shown in FIG. 4, the sealing ring 13a has a portion 27 which is supported in a shoulder which is formed by a recess 28 provided in the groove 12 in the manner similar to that discussed in reference to the embodiment shown in FIG. 2.

Figure 5:
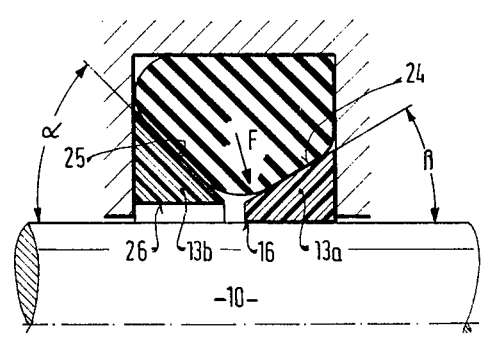
FIG. 5 is a partial section of the couple provided with a further embodiment of the sealing arrangement.

FIG. 5 shows a further embodiment of the sealing arrangement 11' similar to that shown in FIG. 3. However, the surface 24 is inclined at an angle $\beta$ to the horizon whereas the surface 25 includes with the horizon an angle $\alpha$ which is different from the angle $\beta$. It is to be understood that the angle $\alpha$ may be greater or smaller than the angle $\beta$. In the embodiment shown in FIG. 5, the angle $\alpha$ exceeds the angle $\beta$. Such an arrangement is particularly advantageous, since the biasing force F is correspondingly inclined relative to the vertical direction thereof (see FIGS. 1-4). The angles $\alpha$ and $\beta$ may be so selected that the biasing force F is directed right along the edge 16 of the sealing ring 13a.

The supporting ring 13b may be made of injectable synthetic plastic material.

Figure 7:
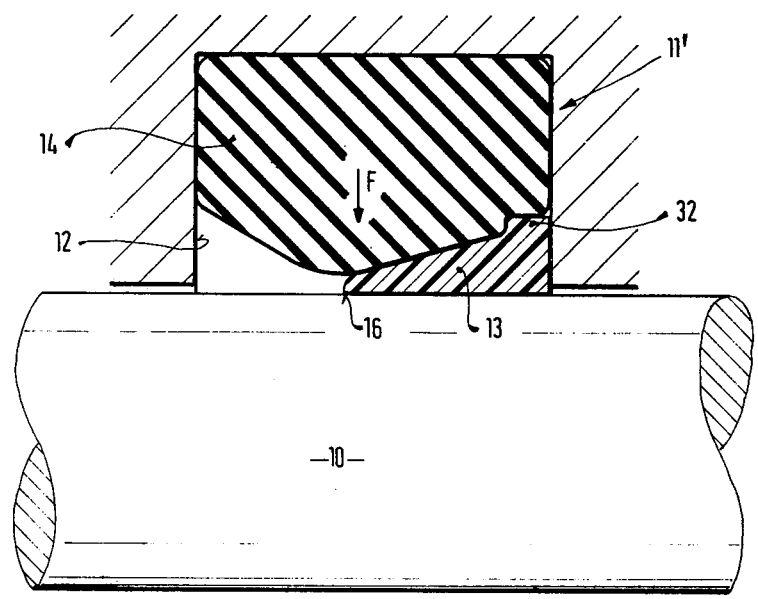
FIG. 7 is a partial section of the couple provided with a still further embodiment of the sealing arrangement.
Figure 8:
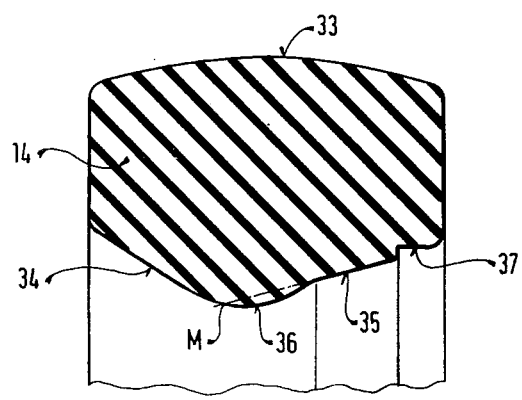
FIG. 8 is a partial section of a ring shown in FIG. 7.

FIGS. 7 and 8 illustrate another embodiment of the sealing arrangement 11' which includes the resilient ring 14 having a configuration different from that of the O-ring shown in FIGS. 1-5. An outer surface 33 of the resilient ring 14 (i.e. the surface which abuts the inner surface of the groove 12 when the resilient ring is in assembly with the cylinder 11) has a slightly bulged (i.e. curved outwardly) configuration. An inner surface of the resilient ring 14 includes a first inclined portion 34 and a second inclined portion 35 which intersect each other at a point designated by M and constitute together an inwardly bulged portion 36 which is arranged substantially at the middle of the inner surface of the resilient ring 14. The portion 35 is formed with a shoulder annular section 37 which receives a corresponding circumferential projection 32 of the sealing ring 13 installed between the resilient ring 14 and the outer surface of the piston 10. The biasing force F acts in a direction along the edge 16 of the sealing ring 13.

While the invention has been illustrated and described as embodied in a sealing arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A sealing arrangement for a two-member couple, comprising a sealing ring interposed between the two members of the couple and having a face engaging one of said members and a first surface bounded by two axially spaced edges; a resilient ring of elastomeric material interposed between the other member of said couple and said sealing ring, said resilient ring having a second surface being in contact with said first surface of said sealing ring; and a groove formed in said other member, open outwardly away toward said one member of the couple and adapted to accommodate said sealing ring and said resilient ring, said first surface of said sealing ring being axially inclined from said one edge toward the other, said second surface of said resilient ring being axially inclined to conform with said first surface, said sealing ring and said resilient ring being arranged in said groove in compressed relationship so that said resilient ring permanently exerts a biasing force upon said sealing ring adjacent to one of said edges to thereby press said face of the sealing ring into tight sealing engagement with said one member.

2. An arrangement as defined in claim 1, wherein said resilient ring constitutes an O-ring.

3. An arrangement as defined in claim 1, wherein said resilient ring is of synthetic plastic material.

4. An arrangement as defined in claim 1, wherein said resilient ring is of elastomeric rubber.

5. An arrangement as defined in claim 1, wherein said sealing ring is of synthetic plastic material.

6. An arrangement as defined in claim 1, wherein said sealing ring is of polytetrafluoroethylene material.

7. An arrangement as defined in claim 1, wherein said sealing ring is of polytetrafluoroethylene compound material.

8. An arrangement as defined in claim 1, wherein said sealing ring extends only over a portion of the width of said groove on said other member.

9. An arrangement as defined in claim 1, wherein said sealing ring has an inconsistant thickness.

* * * * *